Patented Aug. 25, 1936

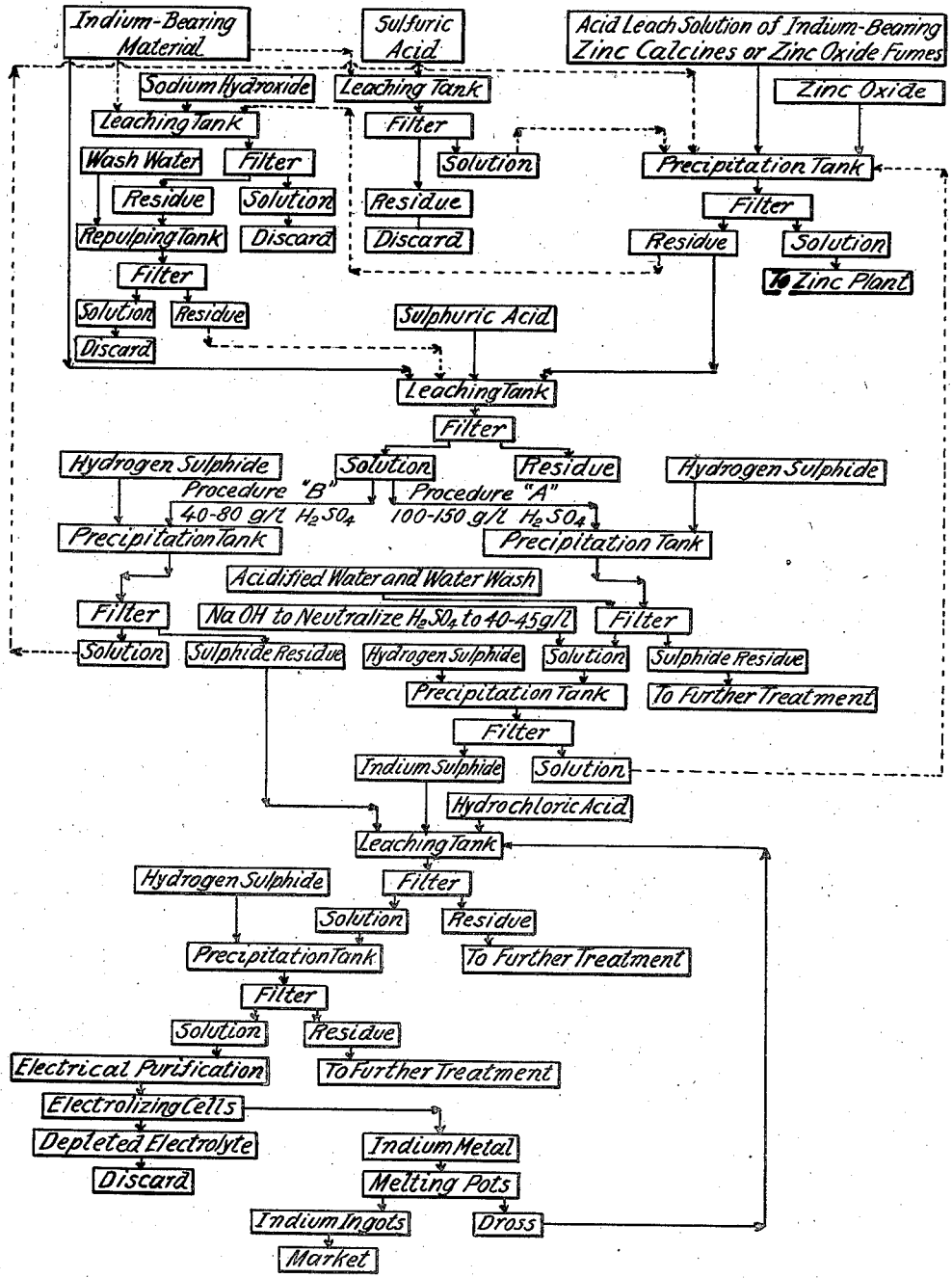

2,052,387

UNITED STATES PATENT OFFICE 2,052,387

TREATMENT OF INDIUM-BEARING MATERIALS

Homer M. Doran, Great Falls, Mont., assignor to Anaconda Copper Mining Company, New York, N. Y., a corporation of Montana Application January 5, 1935, Serial No. 465

2 Claims. (Cl. 204—15)

This invention relates to the recovery of indium and has for an object the provision of an improved process for treating indium-bearing materials to effect the recovery of indium in marketable form.

In accordance with the invention, indium-bearing materials are, if necessary, first subjected to a concentrating operation to obtain a relatively concentrated indium-bearing product. The relatively concentrated indium-bearing product is dissolved and is subsequently treated for the recovery of its indium content.

Briefly, a process of the invention involves treating solid indium-bearing material to convert the indium contained therein to a soluble form and to obtain an indium-bearing solution. The solution may, if necessary, be treated to concentrate the indium, and, thereafter, the indium is precipitated from the solution in a relatively concentrated form, for example in the form of a sulphide by treatment of the solution with hydrogen sulphide. The indium-bearing precipitate is dissolved in an appropriate solvent, and from the resulting solution indium is recovered, preferably in the metallic state by electrolysis. The invention contemplates the treatment of indium-bearing solution obtained at various stages of the process for the removal of impurities contained therein, as will be apparent from a consideration of the detailed description presented below.

Indium is a rare metallic element occurring in some zinc ores. In the electrolytic process for the treatment of such ores, they are first concentrated and the zinc concentrates are roasted to convert them to an acid soluble form, such as zinc oxide. The roasted zinc product is leached with sulphuric acid to dissolve the zinc, and indium, if present, will be taken into solution along with the zinc.

If lead is present in the ore, it is separated from the zinc to a large extent during the concentration step, which is generally in the nature of a flotation operation. Any indium present in the ore will find its way for the most part into the zinc concentrates, and consequently will be present in the acid leach solution of the calcines prepared from such concentrates, but some indium will be associated with the lead concentrates. During the subsequent treatment of the lead concentrates in a blast furnace, the indium associated therewith collects in the blast furnace slag along with any zinc that may be present. This zinc-bearing slag may be treated in the molten state for the recovery of its zinc content by blowing air and pulverized coal through it to obtain a relatively concentrated zinc oxide-bearing fume, with which the indium present in the slag will be associated. A typical fume of this nature contains about 70% zinc, 6% lead, and 0.05% indium. The fume is leached with sulphuric acid, and the indium dissolves along with the zinc.

The process of the invention is particularly well suited to the treatment of the indium-bearing acid solution of zinc obtained by leaching zinc calcines or zinc oxide fumes, as mentioned above. It will, therefore, be described below with particular reference to the treatment of such solutions, but it is to be understood that the process of the invention may also be applied to the treatment of other indium-bearing materials.

The accompanying flowsheet illustrates several preferred procedures for producing indium concentrates and solutions in accordance with the process of the invention.

According to the process of the invention, indium-bearing material is subjected to a suitable treatment to convert the indium to a soluble form. The resulting product is treated to form an indium-bearing solution which is treated for the recovery of indium. Any suitable treatment may be employed for treating the indium-bearing material. Thus, for example, a sulphide ore containing zinc and indium may be roasted to convert the zinc and indium to compounds soluble in sulphuric acid. The resulting product may be leached with an aqueous solution of sulphuric acid to produce an acid solution containing zinc and indium. The acid solution is treated for the separation and separate recovery of zinc and indium.

In the treatment of ore or concentrates containing lead, zinc and indium, the ore may be subjected to a blast furnace treatement to separate lead and form a slag containing zinc and indium. The slag may be treated for the recovery of a product containing the zinc and indium as, for example, by blowing air and a reducing agent such as pulverized coal through a molten bath to form an oxide fume containing zinc and indium. The fume is collected, and it may be leached with sulphuric acid to produce an acid solution containing zinc and indium. The acid solution thus produced is treated for the separation and separate recovery of zinc and indium.

When lead-bearing ore containing indium also contains zinc in considerable amount, the ore may be subjected to a concentrating operation, such as a differential flotation operation, to form separate lead and zinc concentrates. The indium contained in the ore will be found partly in the zinc concentrate and partly in the lead concentrate, and the concentrates may be treated in accordance with the procedures hereinbefore outlined for the production of indium-bearing solutions. Similar products produced in treating the lead and zinc concentrates may be combined at any suitable time during the course of the zinc and/or indium recovery operations, if desired. Thus, for example, the zinc oxide fume containing indium may be combined with the roasted zinc concentrate for further treatment, or indium-bearing solutions obtained by separately treating the zinc oxide fume and the roasted zinc concentrates may be combined for further treatment.

According to a preferred process of the invention, an acid solution containing indium such, for example, as a solution obtained by leaching indium-bearing zinc calcines or zinc oxide fumes with sulphuric acid is introduced into a suitable precipitation tank, and a suitable base, such as zinc oxide, is added until the solution is neutralized or rendered somewhat alkaline, whereupon indium hydroxide, together with a number of other impurities present in the solution, is precipitated. The precipitate is separated from the solution, for example by filtration, and the solution is treated for the recovery of zinc, preferably by electrolysis.

The indium hydroxide-bearing precipitate contains a relatively low percentage of indium and a considerable quantity of impurities, and it is advisable to further concentrate the indium before proceeding to subsequent steps. This may be accomplished by redissolving the precipitate in sulphuric acid and then adding zinc oxide until the solution is neutralized or rendered alkaline. Indium hydroxide is again precipitated, this time together with a smaller quantity of impurities than before, and the precipitate is again separated from the residual solution. The residual solution may be sent to the zinc plant for the recovery of zinc, but inasmuch as it may contain a relatively high percentage of impurities in proportion to its zinc content, it may be more economical to discard it. In the accompanying flowsheet, only one treatment of the solution with zinc oxide and subsequent filtration has been illustrated, but it is to be understood that dissolution of the precipitate and retreatment of the solution with zinc oxide may be repeated as many times as desired. Preferably, it should be repeated until a residue containing a relatively high concentration of indium has been obtained.

During the concentration of the indium in the above-described manner, care should be taken to maintain any iron in solution in the ferrous state while the indium is being precipitated, for otherwise excessive co-precipitation with the indium of other impurities such as arsenic, antimony and germanium may occur. Likewise, care should be taken to employ a minimum amount of zinc oxide to precipitate the indium, since too great a quantity may lead to excessive precipitation of such impurities as arsenic, antimony, iron, germanium, aluminum and gallium.

When a sufficiently concentrated indium-bearing residue has been obtained, it may be introduced directly into a leaching tank and there be dissolved, for example in sulphuric acid. It may be desirable, however, to subject the residue to an additional purification process, particularly if it contains impurities, for example arsenic, which are soluble in a solvent in which the indium is substantially insoluble. This additional process is indicated on the accompanying flowsheet as an optional method of treatment of the residue from the zinc oxide precipitation prior to its introduction into the sulphuric acid leaching tank, and is based on the fact that the arsenic contained in the residue from the zinc oxide precipitation is soluble in a sodium hydroxide solution, whereas the indium is not.

In carrying out this optional purification step, the residue from the zinc oxide precipitation is introduced into a leaching tank and is there treated with an aqueous solution containing about 5% to 15% sodium hydroxide. When the arsenic has been dissolved, the solution is filtered or otherwise separated from the residue and discarded. The residue is introduced into a suitable tank and is washed, for example by repulping with water. The residue is separated from the wash liquor by filtration, and preferably is repulped again with a further quantity of wash water. It is advantageous to continue these alternate repulpings and filtrations of the residue until substantially all of the sodium hydroxide has been removed therefrom. When this has been accomplished, the residue is introduced into the leaching tank and dissolved in sulphuric acid.

The solution from the sulphuric acid leaching tank is separated from any insoluble residue by filtration. The solution may now be treated in accordance with either of two preferred procedures hereinafter described and identified as Procedure "A" and Procedure "B". Procedure "A" is best followed in the event that the optional purification with sodium hydroxide described above has not been carried out, but it may be followed in any event. Procedure "B" is adapted for use in case the sodium hydroxide or equivalent purification has been employed, or in any case where the quantity of impurities contained in the sulphuric acid leach solution is relatively small.

Procedure "A"

The indium-bearing solution, the acidity of which should correspond to a value of about 100–150 grams $H_2SO_4$ per liter, is introduced into a precipitation tank and subjected to the action of a vigorous stream of hydrogen sulphide. Indium sulphide is quite soluble in a solution containing this amount of sulphuric acid, and so does not precipitate, but the sulphides of such impurities as copper, arsenic, antimony and tin are formed and do precipitate. The precipitate is separated from the solution by filtration and washed first with dilute sulphuric acid and then with water to recover occluded indium compounds. The sulphide precipitate may be treated in any appropriate manner for the recovery of the valuable components contained therein. If it contains a substantial quantity of indium, it may be returned to the sulphuric acid leaching tank.

The solution, containing the indium, is treated with a sufficient quantity of basic material, such, for example, as sodium hydroxide, to reduce its acidity to a value corresponding to about 40 to 45 grams $H_2SO_4$ per liter. The resulting solution is introduced into a precipitating tank and subjected to the action of a stream of hydrogen sulphide. Indium sulphide precipitates in a sulphuric acid solution of this strength, and the introduction of the hydrogen sulphide is continued until indium is no longer precipitated. The acidity of the solution during the precipitation of the indium sulphide should be regulated quite closely. More than about 45 grams $H_2SO_4$ per liter retards the precipitation of the indium, while less than about 40 grams H₂SO₄ per liter promotes the precipitation of zinc and, thus, will result in undue contamination of the indium precipitate. When precipitation is complete, the indium sulphide is separated from the residual solution, which should be returned to the zinc oxide precipitation step for the recovery of its indium content, and the indium sulphide is introduced into a leaching tank, wherein it is dissolved in hydrochloric acid.

*Procedure "B"*

The indium-bearing solution from the sulphuric acid leaching tank is appropriately treated to adjust its acidity to a value corresponding to about 40 to 80 grams H₂SO₄ per liter. Hydrogen sulphide is passed through the solution in a suitable precipitating tank, and a sulphide residue containing the bulk of the indium together with such impurities as copper, arsenic, antimony and tin is precipitated. This residue is separated from the residual solution, which should be returned to the zinc oxide precipitation step for the recovery of the indium which it contains, and the residue is introduced into a leaching tank, where it is dissolved in hydrochloric acid.

Whether Procedure "A" or Procedure "B" is followed, the final leaching with hydrochloric acid is preferably carried out with a solution containing about 15 grams HCl per liter. If at the conclusion of the leaching operation, the solution contains a greater quantity of acid, it is advisable to reduce it to about this value by the addition of sodium hydroxide or other suitable base. The indium-bearing hydrochloric acid solution is filtered to separate it from any insoluble residue. The residue may be advantageously treated in any suitable manner for the recovery of its valuable components.

The indium-bearing solution, containing about 15 grams HCl per liter, is introduced into a suitable precipitation tank and subjected to the action of a vigorous stream of hydrogen sulphide. Owing to the fact that indium is substantially more soluble in hydrochloric acid than in sulphuric acid, no appreciable quantity of indium will be precipitated, but the sulphides of various impurities still remaining in the solution, such as copper and arsenic, will precipitate and the solution may thus be substantially freed from these substances. The sulphide precipitate is separated from the solution by filtration, and may be appropriately treated to recover the valuable components which it contains. The solution is then boiled, or a current of air is passed through it, or it is otherwise suitably treated to remove the hydrogen sulphide remaining in solution.

It is frequently desirable to treat the solution thus obtained electrolytically to effect the removal of small quantities of impurities remaining therein. For this purpose, the solution is introduced into an electrolytic cell in contact with indium electrodes, and an electric current is passed through it. Impurities lying below indium in the electromotive series are deposited upon the electrodes, the passage of an electric current through the solution hastening the reactions involved. When impurities have ceased to deposit upon the electrodes, the solution is ready for electrolysis.

The electrolysis of the hydrochloric acid solution of indium is carried out in a suitable electrolytic cell, preferably with graphite electrodes. A current density of about one to fifteen amperes per square foot may be employed, but best results will be obtained with a current density of about approximately four amperes per square foot and a cell terminal voltage of about two.

The electrolysis may be continued until the electrolyte has been depleted to as low as 0.05 gram indium per liter, and the depleted electrolyte may be discarded. Generally, no addition agents are required during the electrolysis of the solution. After the deposition of the indium has continued for about 48 to 96 hours, the electrodes are removed from the solution and the indium metal is stripped from them. The metal may be melted in any suitable vessel (its melting point is only 155° C.) and may be cast into the form of ingots or other suitable shapes. The dross from the melting pots contains a relatively high proportion of indium, and should be returned to the hydrochloric acid leaching tank for retreatment.

Various modifications of the process described above may be made without departing from the spirit of the invention. Thus, for example, if the indium-bearing hydrochloric acid solution, after treatment with hydrogen sulphide, is sufficiently pure, or unless it is desired to produce indium of a high degree of purity, the electrolytic purification with indium electrodes may be dispensed with. If it is desired to recover the indium in the form of a compound of indium, the compound may either be precipitated from the purified solution or may be formed in the solution and be recovered therefrom in any appropriate manner. Other modifications may be made in accordance with conditions encountered in any particular situation.

The process has been described above with particular reference to the treatment of the acid leach solution of the nature customarily obtained in the treatment of zinc calcines or zinc oxide fumes for the recovery of zinc. Other indium-bearing materials, however, may also be treated in accordance with the invention. Thus, for example, a relatively concentrated indium-bearing material may be introduced directly into the sulphuric acid leaching tank and thereafter be treated in accordance with either Procedure "A" or Procedure "B". Alternatively, indium-bearing material may be introduced directly into the sodium hydroxide leaching tank and there be subjected to the preliminary purification treatment for the removal of arsenic prior to its introduction into the sulphuric acid leaching tank. At this point it might be mentioned that the removal of other impurities than arsenic may be effected during this preliminary purification by appropriately choosing the leaching solution. Thus, in place of a sodium hydroxide solution, the indium-bearing material may be treated with any solution in which the impurity desired to be removed is relatively soluble and in which the indium is relatively insoluble.

As another alternative, indium-bearing material may be leached with sulphuric acid and the leach solution may then be introduced into the zinc oxide precipitation tank, where it may be subjected to repeated treatments with zinc oxide to concentrate the indium prior to its subsequent treatment in accordance with the procedures described above. Various other alternative procedures in carrying out the process of the invention will be apparent to those skilled

I claim:—

1. In a process for the recovery of indium involving the production of an acid solution containing indium, the method of obtaining a relatively concentrated indium-bearing solution which comprises subjecting the solution to the action of hydrogen sulphide while maintaining a degree of acidity such that indium will not be precipitated, thereby to effect the separation of impurities by precipitation, separating the precipitated impurities from the residual solution, subjecting the residual solution to the action of hydrogen sulphide while maintaining a degree of acidity such that indium will be precipitated and impurities associated therewith will remain in solution, thereby to form a precipitate containing indium in the form of a sulphide, and treating the precipitate with hydrochloric acid to form a solution containing indium.

2. In a process for the recovery of indium involving the production of a sulphuric acid solution containing indium, the method of obtaining a purified and relatively concentrated indium-bearing solution which comprises adjusting the acidity of the acid solution to a value corresponding to about 100 to 150 grams $H_2SO_4$ per liter, introducing hydrogen sulphide into the solution to precipitate impurities contained therein, separating the precipitated impurities from the residual solution, reducing the acidity of the solution to a value corresponding to about 40 to 45 grams $H_2SO_4$ per liter, thereafter precipitating indium in the form of a sulphide from the solution, and dissolving the indium sulphide in hydrochloric acid.

HOMER M. DORAN.